(12) United States Patent
Taylor et al.

(10) Patent No.: US 10,033,064 B2
(45) Date of Patent: Jul. 24, 2018

(54) METHOD AND APPARATUS FOR FORMING A WOUND STRUCTURE

(71) Applicant: DURACELL U.S. OPERATIONS, INC., Wilmington, DE (US)

(72) Inventors: Daniel Edward Taylor, Cincinnati, OH (US); Stoyan Lokar, Mason, OH (US)

(73) Assignee: DURACELL U.S. OPERATIONS, INC., Wilmington, DE (US)

( * ) Notice: Subject to any disclaimer, the term of this patent is extended or adjusted under 35 U.S.C. 154(b) by 356 days.

(21) Appl. No.: 14/312,728

(22) Filed: Jun. 24, 2014

(65) Prior Publication Data

US 2015/0372340 A1 Dec. 24, 2015

(51) Int. Cl.
*H01M 10/04* (2006.01)
*B65H 18/28* (2006.01)
(Continued)

(52) U.S. Cl.
CPC ...... *H01M 10/0459* (2013.01); *B65H 18/085* (2013.01); *B65H 18/28* (2013.01); *H01G 9/0029* (2013.01); *H01G 9/02* (2013.01); *H01G 9/151* (2013.01); *H01M 6/10* (2013.01); *H01M 10/0404* (2013.01); *H01M 10/0431* (2013.01)

(58) Field of Classification Search
None
See application file for complete search history.

(56) References Cited

U.S. PATENT DOCUMENTS 3,599,888 A 8/1971 Coudriet et al.
3,848,823 A 11/1974 Mitchell
(Continued)

FOREIGN PATENT DOCUMENTS

CN 201254407 6/2009
EP 1291934 B1 7/2008
(Continued)

OTHER PUBLICATIONS

International Search Report and Written Opinion dated Sep. 7, 2015, 12 pgs.
(Continued)

*Primary Examiner* — Sarah A. Slifka
*Assistant Examiner* — Haroon S. Sheikh
(74) *Attorney, Agent, or Firm* — Marshall, Gerstein & Borun LLP

(57) ABSTRACT

A method and apparatus for the production of wound elements. The method comprising: providing a plurality of first electrical web elements; disposing at least one of the first electrical web elements upon a conveying element, wherein a first or second face of the disposed first electrical web elements is disposed in a face to face relationship with the conveying element; providing a plurality of second electrical web elements; disposing at least one of the second electrical web elements upon the conveying element at a predetermined spacing from the disposed first electrical web elements and in a face to face relationship with the conveying element, wherein the predetermined spacing is at least as long as the length of the first electrical web element; and disposing an electrically insulating separator web element in a face to face relationship with the disposed electrical web elements.

3 Claims, 2 Drawing Sheets

(51) Int. Cl.
    *B65H 18/08*    (2006.01)
    *H01G 9/15*     (2006.01)
    *H01G 9/02*     (2006.01)
    *H01G 9/00*     (2006.01)
    *H01M 6/10*     (2006.01)

(56) References Cited

U.S. PATENT DOCUMENTS

| | | |
|---|---|---|
| 3,885,749 A | 5/1975 | Skacel |
| 3,951,890 A | 4/1976 | Reilly et al. |
| 4,909,388 A | 3/1990 | Watanabe |
| 5,030,311 A | 7/1991 | Michal et al. |
| 5,221,056 A | 6/1993 | Walliser et al. |
| 5,370,711 A | 12/1994 | Audit et al. |
| 5,700,299 A | 12/1997 | Clark |
| 5,711,988 A | 1/1998 | Tasi et al. |
| 5,718,395 A | 2/1998 | Nakanose et al. |
| 5,776,628 A | 7/1998 | Kraft et al. |
| 5,779,180 A | 7/1998 | Smedt et al. |
| 5,800,857 A | 9/1998 | Ahmad et al. |
| 5,867,363 A | 2/1999 | Tsai et al. |
| 6,005,764 A | 12/1999 | Tong et al. |
| 6,134,773 A | 10/2000 | Kejha |
| 6,136,422 A | 10/2000 | Lichtenberg et al. |
| 6,500,377 B1 | 12/2002 | Schneider et al. |
| 6,558,438 B1 | 5/2003 | Satoh et al. |
| 6,585,846 B1 | 7/2003 | Hanson et al. |
| 6,620,276 B1 | 9/2003 | Kuntze et al. |
| 6,656,312 B1 | 12/2003 | Schmitz et al. |
| 7,105,253 B2 | 9/2006 | Jito et al. |
| 2002/0122975 A1 | 9/2002 | Spillman et al. |
| 2003/0226928 A1 | 12/2003 | McNeil et al. |
| 2007/0045462 A1 | 3/2007 | McNeil et al. |
| 2007/0045464 A1 | 3/2007 | McNeil et al. |
| 2007/0084958 A1 | 4/2007 | Daul et al. |
| 2007/0215741 A1 | 9/2007 | Vaughn et al. |
| 2008/0237390 A1 | 10/2008 | Okizaki |
| 2010/0279161 A1 | 11/2010 | Kang et al. |
| 2011/0095116 A1 | 4/2011 | Hada et al. |
| 2011/0104572 A1 | 5/2011 | Ahn et al. |
| 2011/0146064 A1* | 6/2011 | Feaver ............ H01M 2/1673 29/623.2 |
| 2013/0133184 A1* | 5/2013 | Bacci ............. H01M 10/0404 29/623.1 |
| 2014/0050957 A1 | 2/2014 | Yang |

FOREIGN PATENT DOCUMENTS

| | | |
|---|---|---|
| EP | 1772914 B1 | 11/2008 |
| GB | 1241903 A | 8/1971 |
| JP | 2007103900 A | 4/2007 |
| KR | 20120118759 A | 10/2012 |
| TW | M314748 | 7/2007 |

OTHER PUBLICATIONS

International Search Report and Written Opinion dated May 27, 2011 in PCT Patent Application No. PCT/US2011/025985.

* cited by examiner

METHOD AND APPARATUS FOR FORMING A WOUND STRUCTURE

FIELD OF THE INVENTION

The invention relates to the field of methods and apparatus for winding structures. The invention relates particularly to the field of winding core structures for power storage devices.

BACKGROUND OF THE INVENTION

Wound structures such as batteries and capacitors are well known. Such structures comprise two or more constituent elements which must be arranged in a predetermined relationship to provide the necessary functionality to the finished device. In some instances a portion of that functionality is the electrical separation of one constituent element from another constituent element often by the use of a third constituent element. Flat batteries, so called due to their generally flat form factor may currently be fabricated using cores comprising anode, cathode and separator materials arranged using relatively inefficient, non-continuous batch processing. As the cost of assembling the wound element must be carried forward into the price of the finished product and as the time necessary for the production of the wound element relates to the cost, a high speed process for the production of the wound element is desired.

SUMMARY OF THE INVENTION

A method and apparatus for the production of wound elements. The method comprises steps of: providing a plurality of first electrical web elements, each having a first face, a second face, a length and a width; disposing at least one of the first electrical web elements upon a conveying element, the conveying element having a conveying direction and a cross-conveying direction, wherein one of the first or second faces of the disposed first electrical web elements is disposed in a face to face relationship with the conveying element; providing a plurality of second electrical web elements, each of the second electrical web elements having a first face, a second face, a length, and a width; disposing at least one of the second electrical web elements upon the conveying element at a predetermined spacing from the disposed first electrical web elements and in a face to face relationship with the conveying element, wherein the predetermined spacing is at least as long as the length of the first electrical web element; and disposing an electrically insulating separator web element in a face to face relationship with the disposed electrical web elements.

The apparatus comprises: a web-conveying element having a direction of travel; a first web-lay-down element disposed adjacent to the web-conveying element along the direction of travel; a second web-lay-down element disposed adjacent to the web-conveying element along the direction of travel and downstream from the first web-lay-down element; a third web-lay-down element disposed adjacent to the web-conveying element along the direction of travel and downstream from the second web-lay-down element; and a web-winding element disposed downstream from the third web-lay-down element and adapted to grip and rotate a web element to wind a combination of web elements.

DETAILED DESCRIPTION OF THE INVENTION

Figure 1:
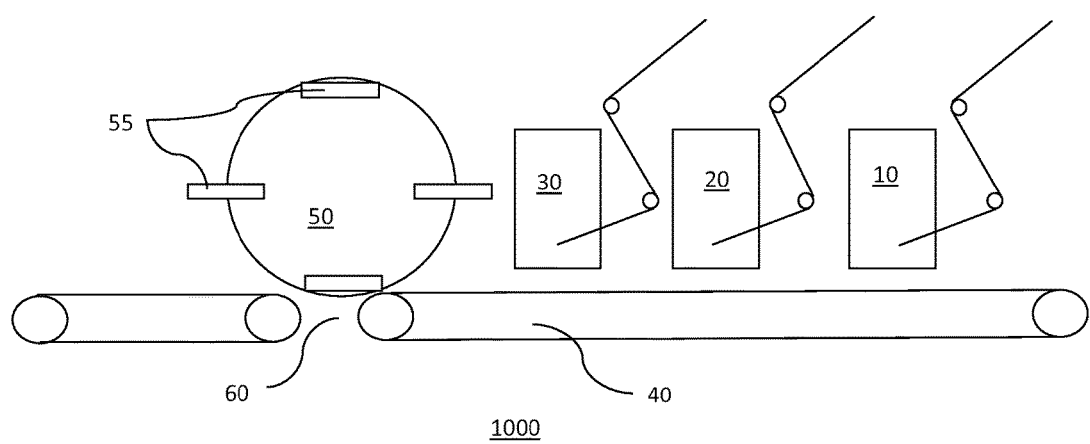
FIG. 1 provides a schematic side view of one embodiment of the invention.

Apparatus for forming a power cell core element, the apparatus comprising: a web-conveying element having a direction of travel; a first web-lay-down element disposed adjacent to the web-conveying element along the direction of travel; a second web-lay-down element disposed adjacent to the web-conveying element along the direction of travel and downstream from the first web-lay-down element; a third web-lay-down element disposed adjacent to the web-conveying element along the direction of travel and downstream from the second web-lay-down element; and a web-winding element disposed downstream from the third web-lay-down element and adapted to grip and rotate a web element to wind a combination of web elements.

The web-conveying element may comprise a belt or linked chain conveying element having a horizontal surface upon which a plurality of constituent web elements may be deposited. The motion of the conveying element carries deposited elements in the direction of travel. The web-conveying element may comprise a vacuum system functionally connected to a perforated conveying element such that the vacuum may act upon web element(s) disposed upon the conveying element in a manner which tends to stabilize the position of the deposited web element(s) relative to the conveying element. The web-conveying element may be driven using conventional industrial pneumatic, hydraulic, or electric drive systems as these are known in the art. The control of the web-conveying element may be via industrial programmable control systems or other industrial control systems. In one embodiment the web-conveying element may be mechanically coupled to the web lay-down elements. In one embodiment the web-conveying element may be digitally coupled to the web-lay down element utilizing rotary position encoders or resolvers coupled to portions of the web-conveying system and/or servo motor systems having position resolving elements incorporated therein. In this embodiment the absolute and/or relative position of any portion of the web conveying element relative to the remainder of the apparatus may be monitored and utilized as a portion of the decision hierarchy for the apparatus.

A series of web element lay down stations may be disposed adjacent to the web-conveying element. Each of the web element lay down stations may be adapted to dispose a particular component web upon the web-conveying element.

The web element lay down stations may be configured to dispose either discrete or continuous web elements upon the web-conveying element. In one embodiment one or more web element lay down station may be configured to cut a continuous supply of a web element into discrete portions and to subsequently dispose each cut portion upon the web-conveying element.

The operation and configuration of the web element lay down stations will be determined according to the desired structure of the wound element to be produced.

In one embodiment a wound element comprising anode and cathode electrode elements together with an electrode separator element will be wound into core elements. In one embodiment a horizontal compilation of the wound element will be assembled and then wound into the element. In this embodiment, a first web element lay down station cuts a continuous supply of anode materials and lays down the cut, discrete anode material portions upon a vacuum assisted web conveying element. The anode portions are disposed upon the web-conveying element with a particular spacing interval between portions. The spacing may be described as a combination of electrode length and winding lengths. As used herein an electrode length refers to a length in the direction of travel corresponding to the length in the direction of travel of an electrode element. As used herein a winding length refers to a length corresponding to at least the length of the separator material necessary for winding the adjacent portion of the separator—electrode composite structure. In a wound structure having a plurality of anode and cathode electrode elements, the winding length will vary, increasing in length from the innermost portion of the structure to the outermost portion. After the horizontal assembly is completed it is wound into the wound element The wound element comprises a stack of alternating anode and cathode elements with a spiral wound separator element wound around them. The anode and cathode elements comprise substantially planar elements having two dimensions (length and width) which are substantially larger than the third dimension (thickness). As the assembly is wound, the separator element alternates between contact with a face of an electrode element and the edge of the wound stack. As the winding of the stack progresses, the overall thickness of the stack increases and the length the separator material must span along the edge of the stack increases. This progressive increasing in the separator material length between electrode elements must be accounted for in the horizontal assembly. The necessary accounting is provided by the progressive increases in the winding lengths as the constituent elements of the horizontal assembly are disposed upon the web-conveying element. The different winding lengths between electrode elements correspond to about the thickness of the wound structure associated with each winding length.

In one embodiment the first disposed anode element is separated from the next subsequent anode element by a combination of two electrode lengths and three winding lengths. Each of the three winding lengths having a different absolute length. The three different winding lengths corresponding to the length of separator material necessary to about the thickness of the wound structure that associated with that winding length as described above. A third anode element is disposed adjacent to the second anode element albeit separated from the second anode element by an appropriate winding length. A pattern of two electrode and three winding lengths then separates this pair of anode electrode elements from the next anode electrode element. Depending upon the total number of anode and cathode elements in the desired wound structure, a pattern of two anode electrode elements separated by a winding length and then three winding lengths interleaved with two electrode lengths will continue to be disposed by the anode web-element lay down station until a final anode electrode element corresponding to the outermost electrode element of the wound element stack is disclosed upon the web-conveying element.

As the stream of disposed anode electrode elements progresses in the direction of travel it passes adjacent to the second web-element lay down station. The second web-element lay down station cuts a supply of cathode materials into discrete electrode portions an disposes these portions upon the web-conveying element. The first cathode portion of an associated horizontal assembly is disposed upon the web-conveying element at a distance upstream of the first anode electrode element of a winding length and an electrode length. The second cathode electrode element is disposed upstream of the first cathode element and separated from it by a winding length. The next pair of cathode electrode elements are disposed in the pace between the next two pairs of anode electrode elements with a pattern of anode element, winding length, cathode element, winding length, anode element, winding length, cathode element, winding length, anode element. This pattern of deposition continues creating a horizontal array of anode and cathode elements arranged in an overall pattern of a single anode element, an electrode space, alternating pairs of cathode and anode elements, and a single anode element with each individual electrode length separated from the adjacent electrode lengths by a winding length of appropriate length.

As the stream of arrayed electrode elements progresses in the direction of travel it passes adjacent to a third web-element lay down station. The third station disposes a separator element upon the upper surfaces of the arrayed electrode elements. In one embodiment an adhesive may be disposed upon the upper surfaces of the electrode elements prior to the deposition of the separator web by an adhesive application station disposed downstream of the second lay down station and upstream of the third lay down station. The adhesive application station may comprise one or more adhesive spray nozzles coupled to an adhesive pump and adhesive supply reservoir. The spray system may apply liquid adhesive to the upper surface of at least some of the passing electrode elements to facilitate bonding between the separator element and the electrode elements. In one embodiment the electrode materials may comprise adhesive upon a surface as they are provided to the first and/or second lay down stations such that the disposed discrete portions of electrode material comprise an upper adhesive surface.

In one embodiment the separator material may comprise an adhesive surface and may be disposed upon the arrayed electrode elements with that adhesive surface facing the upper surfaces of the electrode elements In one embodiment no adhesive may be utilized to facilitate boding between the electrode elements and the separator element.

In one embodiment the electrode elements may be laminated to the separator using heat and/or pressure. In this embodiment the lamination process is completed to ensure the electrodes stay in proper position for the winding operation. If the web-element lay down operations included the use of glue the heated preliminary lamination to bond the electrode to separator may not be necessary. The laminator consists of a heated upper roll and a heated lower roll. Either or both of the rolls may contain a pattern to create bonding in a specific location or may be smooth for all over bonding. As the horizontal assembly travels between the two rolls, the laminator forms a heat seal of the electrodes and separator by a combination of pressure and/or temperature. The heat seal could be a thermoplastic bond of the materials or activation of separately applied bonding agent.

In one embodiment the separator element may be disposed upon the web-conveying element at the first web element lay down station. In this embodiment, anode and cathode electrode elements may be disposed in a horizontal array as described above by the second and third web-element lay down stations directly upon the separator element rather than upon the web-conveying element.

In one embodiment the web-element lay down station associated with the deposition of the separator material may comprise a web cutting element adapted to separate discrete potions of the separator element from the supply of material as or after sufficient separator material for each discrete horizontal assembly is dispensed upon the web-conveying element.

In one embodiment the trailing edge of the cut separator element may be registered with the trailing edge of the last anode element of the passing horizontal assembly. In this embodiment, the leading edge of a subsequent portion of separator material may be disposed in registration and alignment with the leading edge of the first anode electrode element of the next array of anode and cathode elements. The rotational speed of the separator lay down station may be adjusted as necessary to achieve this registration with the trailing and leading edges while accommodating any intervening spacing between the last anode of a downstream assembly and the first anode of an upstream assembly.

The completed horizontal assemblies are transported along the direction of travel to a winding station. The winding station may comprise one or more winding elements. In one embodiment, a single winding element comprises at least one gripper assembly. The gripper assembly comprises at least one gripper head comprising a pair of jaws parallel to and along the direction of travel such that a lateral edge of the horizontal assembly passes between an upper and lower jaw. The jaws may be pneumatically, hydraulically, or electrically actuated to clamp upon the passing assembly as the first anode passes between them. The gripper assemblies may comprise a system of ports coupled to a low pressure or vacuum source to further assist in stabilizing the horizontal assembly elements during the subsequent winding operation. The winding element may be adapted to rotate the gripper assembly such that the horizontal assembly is wound into the wound element. In one embodiment the winding element executes one-half a rotation per electrode element. At the completing of the rotary winding, the jaws may be actuated to release the now wound assembly.

In one embodiment the separator element may be continuously deposited upon either the web-conveying element or the electrode element array and cut to form discrete horizontal assemblies as each assembly engages the winding station. In one embodiment a web separator festoon may be used to accumulate separator material during a time interval when the downstream horizontal assembly has been stopped to enable a separator cutting element to cut the separator. After the separator has been cut the motion of the now discrete assembly and the leading edge of the upstream separator element each proceed downstream.

In one embodiment, the winding element may be disposed upon a winding carousel having an axis of rotation transverse to the direction of travel, with the axis of rotation of the winding element also being transverse to the direction of travel. In this embodiment, the carousel rotates as the winding element also rotates. The rotation of the carousel carries the winding element away from the path of the conveying element and then returns it to the path as the rotation of the winding element is completed such that the wound element may be deposited upon either the web-conveying element or a new wound element conveying element in or near the plane of the web-conveying element. In this embodiment, the rotation of the carousel creates clearance between the rotating gripper head and the web-conveying element.

In one embodiment the winding station comprises winding elements disposed upon each side of the web-conveying element such that gripper heads clamp portions of the first anode electrode element on each lateral edge of the electrode and opposite winding elements act together to wind the horizontal assembly. In this embodiment, each of the opposing winding elements may be driven or one may be driven with the opposing element rotating under the influence of the driven element. The winding elements may be directly driven using pneumatic, hydraulic, or electric motive force. Position encoders or resolvers may incorporated into the mechanism of the winding element enabling a control system to monitor the rotational position and number of rotations of the element and to at upon this information.

In one embodiment the winding station comprises a plurality of winding elements as described above. In this embodiment the respective winding elements are arrayed upon the winding carousel. A plurality of winding elements enables the winding of multiple horizontal assemblies during each rotation of the carousel thereby reducing the rotational speed at which the carousel must operate to accommodate any given number of incoming horizontal assemblies.

In one embodiment pitch control (electrode element spacing) is controlled by the web-element lay down unit. These units for placing the electrode elements consist of an upper anvil roll, a lower die roll, and a transfer drum. The anvil roll is loaded and unloaded by two air cylinders. Stiff springs keep the rolls in the open position when the cylinders are dumped. The die roll is ported to provide a vacuum coupled electrode element contact surface which holds the electrode on the roll as it is cut. It is then blown off as it is picked up by the transfer drum. The transfer drum holds the electrode with vacuum. The electrode will be transferred through blow off air from the transfer drum to the main web vacuum conveyor.

The rotational speed of the cutting anvil and die is fixed so that the same length electrode is cut each time. The laydown drum is of sufficient diameter so that it can hold at least one full electrode around its circumference plus have additional circumference to allow proper spacing. The laydown drum is independently servo motor driven so that it can be accelerated and decelerated to provide a different spacing between each electrode. This variation in spacing is critical to maintain so that the electrodes will be properly stacked in the final wound cell configuration.

In one embodiment the horizontal assembly may cross a transitional gap between the web-conveying element and the winding element. In this embodiment, the assembly proceeds across a gap between the web-conveying element and the winding element prior to the action by the gripper head to acquire control of a portion of the edge of the horizontal assembly.

The described apparatus may be used to form wound elements. In one embodiment a method for forming wound power cell cores includes steps of providing a continuous supply or a plurality of first electrical web elements; if a continuous supply is provided the supply is subsequently separated into a plurality of discrete elements. Each element has a first face, a second face, a length and a width. The first electrical web elements are disposed upon a conveying element. The conveying element has a conveying direction and a cross-conveying direction. One of the first or second faces of the disposed first electrical web elements is disposed in a face to face relationship with the conveying element. A continuous supply or a plurality of second electrical web elements is provided. In an embodiment where a continuous supply is provided, the supply is subsequently separated into a plurality of discrete elements. Each of the second electrical web elements also has a first face, a second face, a length, and a width. Each of the second electrical web elements is disposed upon the conveying element at a predetermined spacing from the disposed first electrical web elements and in a face to face relationship with the conveying element. The predetermined spacing is at least as long as the length of the first electrical web element. A supply of a electrically insulating separator element is provided and disposed in a face to face relationship with the disposed electrical web elements. As described the separator element may be bonded to the electrode elements or may de disposed without bonding. The separator and electrodes may be thermally laminated or remain unattached to each other.

In one embodiment the method includes the further steps of gripping an edge of the first electrical web element; rotating the first electrical web element; winding the combination of first and second electrical web elements and insulating separator element into a wound power core element.

In one embodiment the method may include disposing the separator element first and subsequently disposing the electrode elements upon the separator. In this embodiment the composite stricter may also be wound as described.

The described apparatus and method yield a plurality of wound power cell core elements. Each such element comprising: a plurality of anode elements; a plurality of cathode elements; and a separator element. The anode and cathode elements are disposed face-to-face in a stack and the separator element is disposed in a spiral winding between the faces of the anode and cathode elements, the separator encircling the anode and cathode elements.

As shown in FIG. 1, the winding apparatus 1000, lay down stations: 10, 20, and 30, are disposed above conveying element 40. The horizontal array of anode, cathode, and separator elements, (not shown) proceeds to the left in the figure to the winding element 50. The winding element 50 comprises a number of gripping elements, 55, for the purpose of gripping a portion of the array to enable the winding of the array into the power element core assembly.

Figure 2:
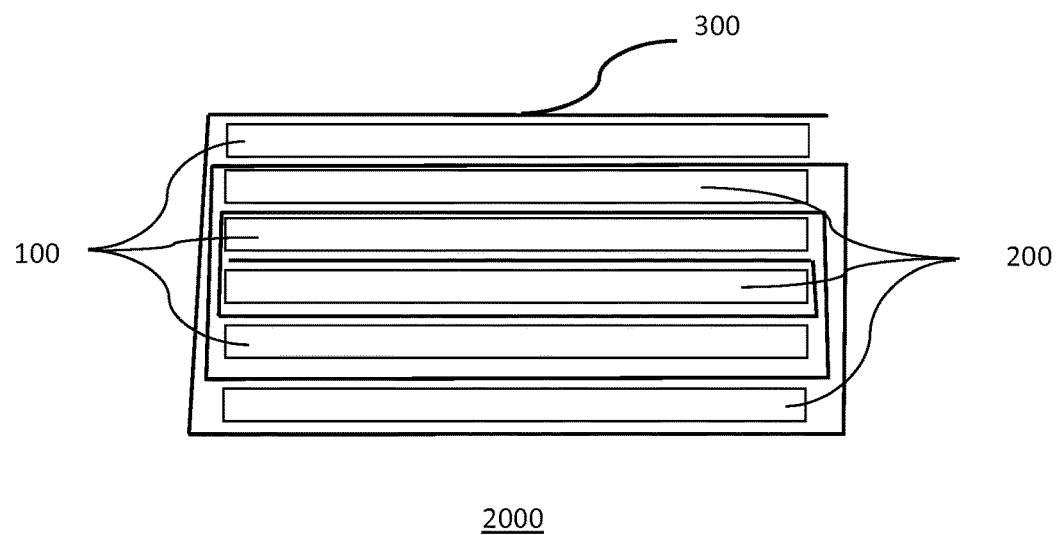
FIG. 2 provides a schematic plan view of the components of a wound core element.

As shown in FIG. 2, the wound assembly 2000, comprises a stack of anode elements 100, cathode elements, 200, and separator element 300 wound in a spiral manner about the anode and cathode elements.

Exemplary cathodic material include lithium intercalation materials such as lithium manganese oxide, lithium cobalt oxide, lithium nickel oxide or a complex oxide formed from a combination of aforesaid oxides. The cathodic material may be coated on a cathode current collector, that is, a foil prepared from aluminum, nickel, or a combination thereof, to form a cathode. Exemplary anodic material includes lithium metal or lithium alloy, and lithium intercalation materials such as carbon, petroleum coke, activated carbon, graphite or other carbons. The anode material may be coated on an anode current collector, that is, a foil prepared from copper, gold, nickel, copper alloy or a combination thereof to form an anode. The separator layer may comprise a micro-porous polyethylene film, a micro-porous polypropylene film, or a multi-layer film, or a polymer film for solid polymer electrolyte or gel-type polymer electrolyte such as polyvinylidene fluoride, polyethylene oxide, polyacrylonitrile or polyvinylidene fluoride hexafluoropropylene copolymer. The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for forming a power cell core; the method comprising steps of:
   a. providing a plurality of first electrical web elements, each having a first face, a second face, a length and a width;
   b. disposing at least one of the first electrical web elements upon a conveying element, the conveying element having a conveying direction and a cross-conveying direction, wherein the first face of the at least one of the first electrical web elements is disposed in a face to face relationship with the conveying element;
   c. providing a plurality of second electrical web elements, each of the second electrical web elements having a first face, a second face, a length, and a width;
   d. disposing at least one of the second electrical web elements upon the conveying element at a predetermined spacing from the at least one of the first electrical web elements and in a face to face relationship with the conveying element, wherein the predetermined spacing is at least as long as the length of the at least one of the first electrical web elements, and wherein the first face of the at least one of the second electrical web elements is disposed in a face to face relationship with the conveying element;
   e. disposing each of the first and second electrical web elements upon the conveying element at a distance upstream of an adjacent one of the first and second electrical web elements such that the distance between adjacent ones of the first and second electrical web elements progressively increases as the first and second electrical web elements are disposed upon the conveying element;
   f. disposing an electrically insulating separator web element in a face to face relationship with the second face of each of the first and second electrical web elements disposed upon the conveying element;
   g. gripping at least one of the first electrical elements with a winding element, the winding element being disposed on a carousel; and
   h. rotating the winding element about a first axis of rotation while rotating the winding element with the carousel about a second axis of rotation to wind a combination of the first and second electrical web elements and the electrically insulating separator web, wherein rotation of the carousel about the second axis of rotation initially carries the winding element and the first axis of rotation away from the conveying element to create clearance between the rotating winding element and the conveying element.

2. The method according to claim 1, comprising, prior to winding the combination of the first and second electrical web elements and the electrically insulating separator web element, conveying the combination of the first and second electrical web elements and the electrically insulating separator web element across a gap between the conveying element and the winding element.

3. The method according to claim 1, comprising, prior to winding the combination of the first and second electrical web elements and the electrically insulating separator web element, cutting the electrically insulating separator web element.

* * * * *